(12) United States Patent
Hamada et al.

(10) Patent No.: US 7,933,052 B2
(45) Date of Patent: Apr. 26, 2011

(54) DOCUMENT FEEDER AND IMAGE CAPTURING DEVICE

(75) Inventors: Masataka Hamada, Minamikoma-gun (JP); Kazuhisa Mochizuki, Minamikoma-gun (JP); Seiji Nishizawa, Minamikoma-gun (JP)

(73) Assignee: Nisca Corporation, Minamikoma-gun (JP)

( * ) Notice: Subject to any disclaimer, the term of this patent is extended or adjusted under 35 U.S.C. 154(b) by 846 days.

(21) Appl. No.: 11/865,012

(22) Filed: Sep. 30, 2007

(65) Prior Publication Data

US 2008/0158621 A1  Jul. 3, 2008

(30) Foreign Application Priority Data

Dec. 27, 2006 (JP) ................. 2006-352163

(51) Int. Cl.
*H04N 1/04* (2006.01)
*B65H 5/22* (2006.01)
(52) U.S. Cl. .................... 358/498; 271/3.14; 271/8.1
(58) Field of Classification Search .............. 358/496, 358/498, 474, 494; 399/361, 363; 271/3.14, 271/3.18, 8.1
See application file for complete search history.

(56) References Cited

U.S. PATENT DOCUMENTS

| | | | | |
|---|---|---|---|---|
| 7,540,492 B2 * | 6/2009 | Miyazaki | ...................... | 271/153 |
| 7,784,783 B2 * | 8/2010 | Teo et al. | ...................... | 271/186 |
| 2004/0213589 A1 * | 10/2004 | Barbera et al. | .................. | 399/16 |
| 2007/0126176 A1 * | 6/2007 | Ha | ............................... | 271/245 |
| 2007/0170639 A1 * | 7/2007 | Istre et al. | ...................... | 271/121 |
| 2008/0001347 A1 * | 1/2008 | Krause et al. | .................. | 271/193 |

FOREIGN PATENT DOCUMENTS

JP  H09-018631  1/1997

* cited by examiner

*Primary Examiner* — Jerome Grant, II
(74) *Attorney, Agent, or Firm* — Judge Patent Associates

(57) ABSTRACT

Document feeder and image capturing device preventing empty stamping associated with improper positioning of printing unit. Document feeder A, conveying document originals from a document placement location, along a predetermined conveyance path (12), and to a document information-capturing location (5, 6), is furnished with: a printing unit (8), which is shiftable along the document widthwise direction approximately orthogonal to the document conveyance direction, and is for carrying out predetermined printing onto conveyed documents; and a detection unit (S4), provided in the conveyance path further upstream in the conveyance direction than the printer unit (8), that detects whether a conveyed document will pass inside the limits of the range in which the printer unit (8) prints.

13 Claims, 5 Drawing Sheets

DOCUMENT FEEDER AND IMAGE CAPTURING DEVICE

BACKGROUND OF THE INVENTION

1. Technical Field

The present invention relates to document feeders for conveying document originals from a document placement location, along a predetermined conveyance path, and to a document information-capturing location, and also relates to image-capturing devices—such as facsimile machines, scanners, and photocopiers—furnished with such document feeders.

2. Description of the Related Art

Automatic document feeders (ADFs) that send out one-by-one and convey to a document information-capturing location document originals stacked on a document tray are long since well-known. In this class of document feeders, machines furnished with printing means that print text or other markings, such as "SCANNED" or "FAXED," in an inconspicuous place on a document from which image information has been captured are also known.

One example of a document-information capturing device furnished with a document feeder having a printing means of this kind is disclosed in, for instance, Japanese Unexamined Pat. App. Pub. No. H09-18631. This document-information capturing device is equipped with, as a printing means, a stamper that stamps post-image-capturing documents with a mark. The stamper is supported on a guide rail stretching along the widthwise direction of the document (direction orthogonal to the document conveyance direction). Accordingly, a user can manually shift the stamper to any desired location in the document widthwise direction.

With the configuration disclosed in Pat. App. Pub. No. H09-18631, however, if the stamper is not set into an appropriate location, specifically, if a user makes an error as to the size of a document original—for example, if he or she mistakes the conveyed document to be in A4 landscape, even though it is in A4 portrait, orientation—and ends up situating the stamper in a position where the edge of a landscape-oriented A4 document would pass, because the document does not actually traverse the position where the stamper has been situated, a site where there is no document gets stamped in vain (gets empty-stamped) by the stamper, whereby the conveyance path is left gummed with ink, which leads to incidents of subsequent documents becoming splotched with the ink. Moreover, this problem is linked to ink wastage.

BRIEF SUMMARY OF THE INVENTION

An object of the present invention, brought about focusing attention on the circumstances just described, is to make available a document feeder and image capturing device whereby empty stamping associated with improper positioning of the printing means is prevented.

In order to resolve the aforementioned issues, the present invention affords a document feeder that is for conveying document originals from a document placement location, along a predetermined conveyance path, and to a document information-capturing location, and that is furnished with: printing means, shiftable along the document widthwise direction being approximately orthogonal to the document conveyance direction, for carrying out predetermined printing onto conveyed documents; and detection means, provided in the conveyance path further upstream in the document-conveyance direction than the printing means, for detecting whether a conveyed document will pass inside the limits of the range in which the printing means prints.

Furthermore, the present invention also affords an image capturing device equipped with a document feeder of the above-described configuration, and an image capturing means for capturing image information from a conveyed document, in the document information-capturing location.

According to the present invention, within the conveyance path further upstream in the document-conveyance direction than the printing means, a detection means is provided to detect whether a conveyed document will traverse the printing range delimited by the printing means, thanks to which empty stamping associated with improper positioning of the printing means can be prevented.

DETAILED DESCRIPTION OF THE INVENTION

A preferred embodiment of the present invention will now be explained based on the drawings provided.

Figure 1:
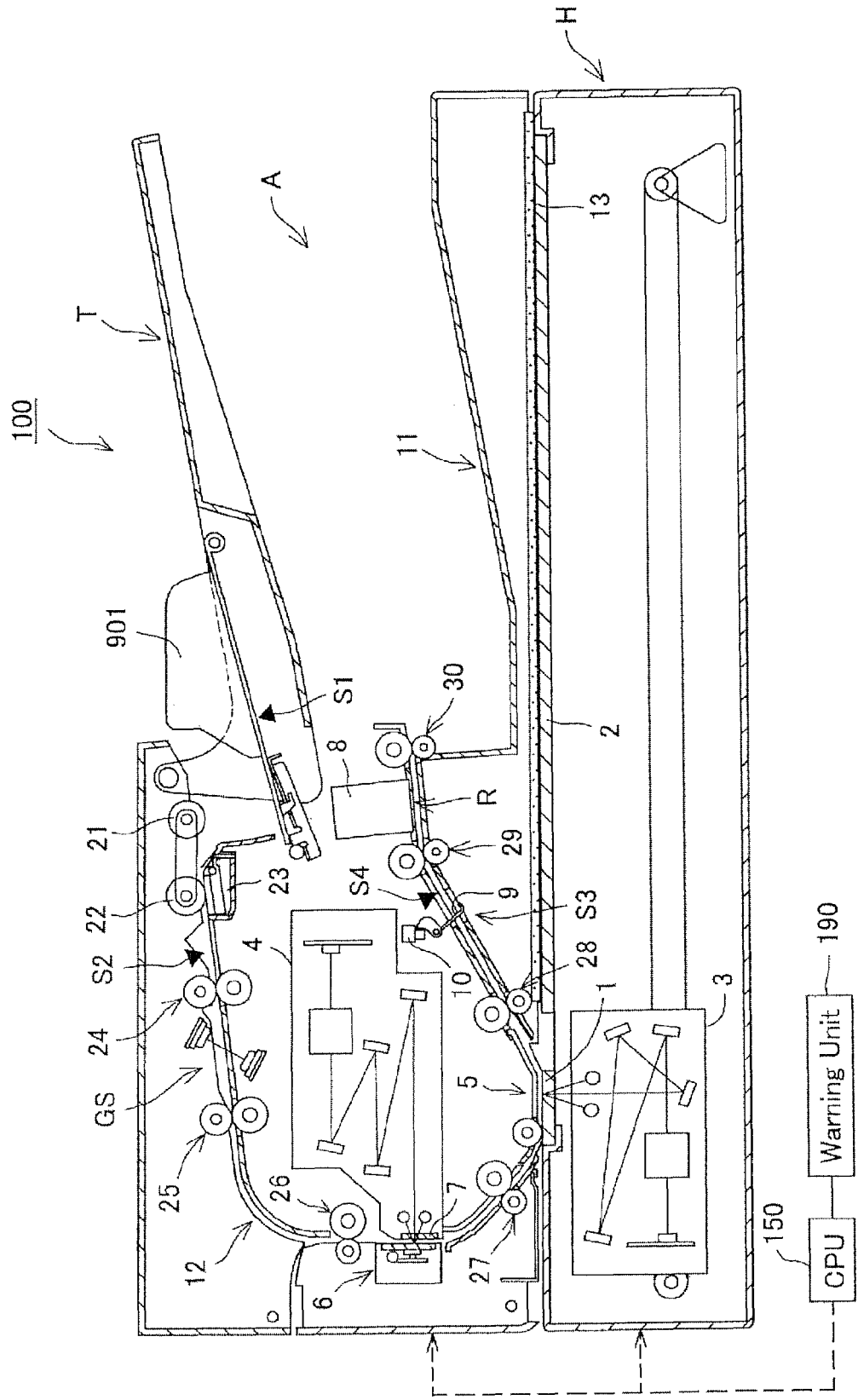
FIG. 1 is a sectional view illustrating an image capturing device furnished with a document feeder involving one embodiment of the of the present invention.

FIG. 1 is a sectional view of an image capturing device 100 equipped with a document feeder of the present invention. The image capturing device 100, which adopts the present invention, will now be explained with reference to FIG. 1. The image capturing device 100 can be used as a stand-alone scanner connected to a PC or network, or as part of an MFP (multi-function peripheral) connected to an image-forming apparatus such as a printer or the like. Reference mark A labels a document feeder installed on the image capturing device 100. The document feeder A conveys a document original (simply "original" hereinafter) along a predetermined conveyance path to pass the original over a first contact glass 1 surface of the image capturing unit H used as the image capturing means. Note that the image capturing device 100 has a CPU150 used as the control means that controls operations of the document feeder A and the image capturing unit H.

The image capturing unit H is equipped with a first reading unit 3 that reads images on an original by irradiating light from a light source such as a lamp or the like onto an original conveyed via the first contact glass 1; reflecting the reflected light by a plurality of mirrors via a lens and then photoelectrically converting that by photoelectric conversion means such as CCD or the like. Note that the top surface of the first contact glass 1 composes the first reading position 5 (a document information-capturing location of the document feeder A) of the image capturing unit H.

Also, the image capturing unit H is equipped with a second contact glass 2 where an original can be set. A thick original, such as a book or the like, can be placed on the second contact glass 2 by opening the document feeder A, and then moving a first reading unit 3 in a sub-scanning direction to read images on that original on the second contact glass 2.

The document feeder A is equipped with a feeder tray T that stacks a plurality of originals using a center alignment; and a discharge tray 11 disposed under the feeder tray T to store read originals. Two guide members 901 are mounted on the feeder tray T to enable their movement in a width direction (a direction substantially perpendicular to the direction of original conveyance) of the feeder tray T based on substantially the center thereof. The originals in the feeder tray T are set aligned to the center of the feeder tray T by these two guide members 901 touching both sides of the originals stacked in the feeder tray T. Therefore, originals are aligned to the center while being conveyed through the entire conveyance from the feeder tray T to the discharge tray 11. Specifically, the guide member 901 is composed of center-referent delivery means that feeds an original P so that a centerline L2 of the original P width direction X is aligned substantially to a centerline L1 of the conveyance path (see FIG. 2) for both rollers 21 and 22 described below. Furthermore, a pressing cover 13 composed of a porous member such as sponge or the like and a film member such as white Mylar that presses against the second contact glass 2, and a U-shaped conveyance path 12 that conveys an original from the feeder tray T to the discharge tray 11 are provided.

A second reading unit 4 (at a document information-capturing location of the document feeder A) for reading an original is provided at the bend of a U-shaped conveyance path 12. The second reading unit 4 is composed to read original images by irradiating light from a light source such as a lamp or the like on an original conveyed via a third contact glass 7 that forms part of the conveyance path 12 as a second reading position 6, then to photoelectrically convert that light, reflected by a plurality of mirrors into a lens, using photoelectric conversion means such as a CCD or the like. Specifically, to greatly shorten the image reading process times of both sides of an original, this apparatus is configured to read one side of an original that passes over the second reading position 6 of the conveyance path 12 using the second reading unit 4 described above, and to read the other side of the original at the first reading position 5 using the first reading unit 3.

The U-shaped conveyance path 12 is equipped with kick roller 21 that kicks out an original from the feeder tray T; separating means composed of a feed roller 22 and separating pad 23 that separate originals conveyed from the kick roller 21 into single sheets to be fed; a pair of registration rollers 24 that remove any skewing in the original by aligning the leading edge of the original when it is fed from the feed roller 22 and the leading edge of the original engages the pair of registration rollers 24 and then drive to convey the original to a downstream side; a pair of feed rollers 25 that feed the original from the registration rollers 24 toward the second reading position 6 and the first reading position 5; a pair of first reading rollers 26 that convey the original from the pair of feed rollers 25 to the second reading position 6; a pair of second reading rollers 27 that convey the original one side thereof read at the second reading position 6 to the first reading position 5; a pair of third reading rollers 28 that convey out from the first reading position 5 the original the other side thereof read at the first reading position 5; a pair of first discharge rollers (conveyance rollers) 29 that receives the original both sides thereof read from the pair of third reading rollers 28 and conveys the original toward the discharge tray 11; and a pair of second discharge rollers (conveyance rollers) 30 that discharge the original into the discharge tray 11. The pair of first discharge rollers 29 and the pair of second discharge rollers 30 are positioned at an upstream side and a downstream side of conveyance direction of the printer unit 8 to grip both sides of the original traversing the printer unit 8 for conveyance.

The following will now explain original conveyance operations using the document feeder A configured as described above. First, originals are detected to be stacked on the feeder tray T by an empty sensor S1. If a paper feed instruction is received from the image capturing unit H, the kick roller 21 and feed roller 22 are driven. This kicks out originals which are separated to feed a single sheet by the separating means. Also, when a registration sensor S2 detects a leading edge of the fed original, the original is fed a predetermined amount from the point that the original was detected to engage the leading edge of the original at a nipping point of the pair of registration rollers 24. This aligns the leading edge of the original to remove any skew of the original. Then, the pair of registration rollers 24, the pair of feed rollers 25 and the pairs of reading rollers 26, 27, and 28 are driven. This conveys the original along the U-shaped conveyance path 12 to feed it to a downstream discharge tray, turning the original over from front to back in the process. In the U-shaped conveyance path, the original passes by the second reading position 6 and the first reading position 5 in that order. In the process to pass through the second reading position 6 and the first reading position 5, one surface of the original is read at the second reading position 6, and the other side of the original is read at the first reading position 5.

The leading edge of the original is detected by a discharge sensor unit S3, and the pair of the first discharge rollers 29 and the pair of the second discharge rollers 30 drive up to the point where the leading edge of the original reaches the pair of the first discharge rollers 29. This operation reads both sides of the original at the second reading position 6 and the first reading position 5, then the pair of first discharge rollers 29 and the second discharge rollers 30 discharge the original to the discharge tray 11. Note that the discharge sensor unit S3 is disposed near the center of the conveyance path to detect any size of originals. This sensor unit is composed of a lever 9 that is rotated by the leading edge of the original coming into contact therewith, and a sensor 10 that detects the leading edge of the original by detecting a member mounted to the shaft of the lever 9. Specifically, the discharge sensor unit S3 functions as an original passing detection means that detects the passing of a conveyed original. Then, after a predetermined amount of time after the trailing edge of the original is detected by the discharge sensor unit S3, the drives of the first discharge rollers 29 and the second discharge rollers 30 are stopped and the reading operation is ended. Note that the discharge sensor unit S3 is used as a sensor that detects the leading edge of the original to measure the timing to drive the printer head 800, as described in detail below.

Note that a shingle-feed detection sensor (shingle-feed detection means) GS that detects a "shingle-feeding" of a plurality of overlapped originals is provided in the conveyance path 12 between the registration rollers 24 and the feed roller 25, in the document feeder A according to this embodiment of the present invention. This shingle-feed detection sensor GS is configured to detect a shingle-feed of originals by a received vibration level of ultrasonic waves. The sensor GS disposes an emitter that emits ultrasonic waves, and a receiver that receives the ultrasonic waves opposite to each other to sandwich the path. The printer unit 8 is disposed in the conveyance path 12 between the first discharge rollers 29 and the second discharge rollers 30 (in other words further downstream than the document information-capturing location 5) as the printing means. The printer unit 8 prints a maximum of 40 characters on the original surface of the original conveyed by the first discharge rollers 29 and second discharge rollers 30, and prints characters to notify the user whether shingle-feeding of originals has occurred when shingle-feeding of originals has been detected. A printer sensor S4 (detection means) is provided at an upstream side of the printer unit 8 and the first discharge rollers 29, to detect whether an original is at the print head printing position, or more specifically whether the conveyed original has passed inside a range of a printing region (inside are range for printer head movement) for printing by the printer head (printer unit 8). The printer sensor S4 is composed of a reflective type sensor, and is installed to move along with the movement of the printer unit 8 in the original width direction.

Figure 2:
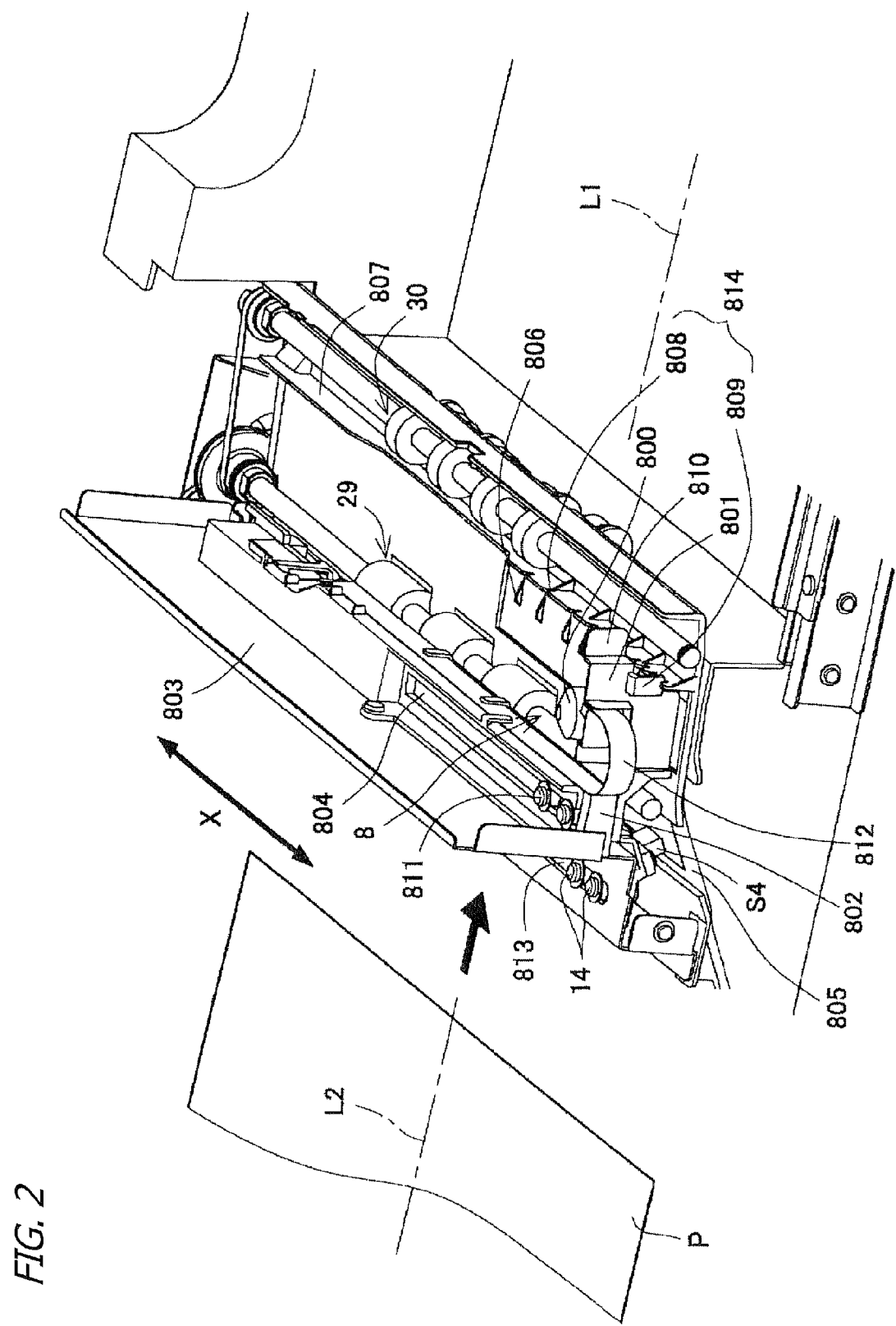
FIG. 2 is an oblique view illustrating the configuration of a printer unit and its environs.

The printer unit 8 will now be explained in detail with reference to FIG. 2.

As shown in the drawing, the printer unit 8 has an ink-jet type printer head 800, and a head support portion 801 that detachably mounts and supports the printer head 800. A cable 812 is connected to the printer head 800 to receive a print start command or character data and to supply power.

The head support portion 801 is supported by a resin head guide member 802 fastened to a metal frame 803 and moves in a width direction (shown as the arrows X in the drawing) of the original over a conveyance guide 805 that forms an original conveyance path. The head guide member 802 has a substantially rectangular opening 804 formed along the Xdirection of the width of the original from substantially the center to one side (the front side in the drawing) of the apparatus. Two screw holes are formed in the head support portion 801. By inserting and tightening screws 811 into the screw holes in the head support portion 801 from above the opening 804, the head support portion 801 can be movably supported by the head guide member 802. Note that the opening 804 is formed to be only half of the original conveyance path so the range of movement it is only approximately half of the original conveyance path. A projection 810 is formed on the head support portion 801 so the user can grip that projection 810 and move the head support portion 801. Note that the opening 813 that guides the printer sensor S4 when the printer sensor S4 is moved in the width direction of the original, described in further detail below, is formed in the frame 803. In the same way as the opening 804 is formed to guide the printer head 800, the opening 813 is approximately half the size of the original conveyance path along the original width in the Xdirection.

A plurality of printing openings 806 formed to match printing positions of each size of the originals is formed in the conveyance guide 805. There is a rib 807 formed along the original width in the Xdirection downstream of the printer head 800. A plurality of grooves 808 is formed in the rib 807 to correspond to each original size. A groove engaging portion 809 that engages the grooves 808 is formed on the head support portion 801. The printer head 800 is fastened to predetermined printing positions that correspond to the original sizes by the engagement of the grooves 808 and groove engaging portion 809. (Specifically, the grooves 808 and groove engaging portion 809 compose positioning means 814 that selectively positions (to fasten the printer head 800 at predetermined printing positions that correspond to the original sizes) the printer head 800 (printing means) at a plurality of positions along the original width direction.) Also, characters and the like are printed on the original via the printing opening 806 at each printing position. Note that by setting the original size (for example A4 or A3) that the grooves 808 corresponded to, near the grooves 808, it is convenient for the user because it is possible to know where the printer head 800 should be fastened.

Figure 3:
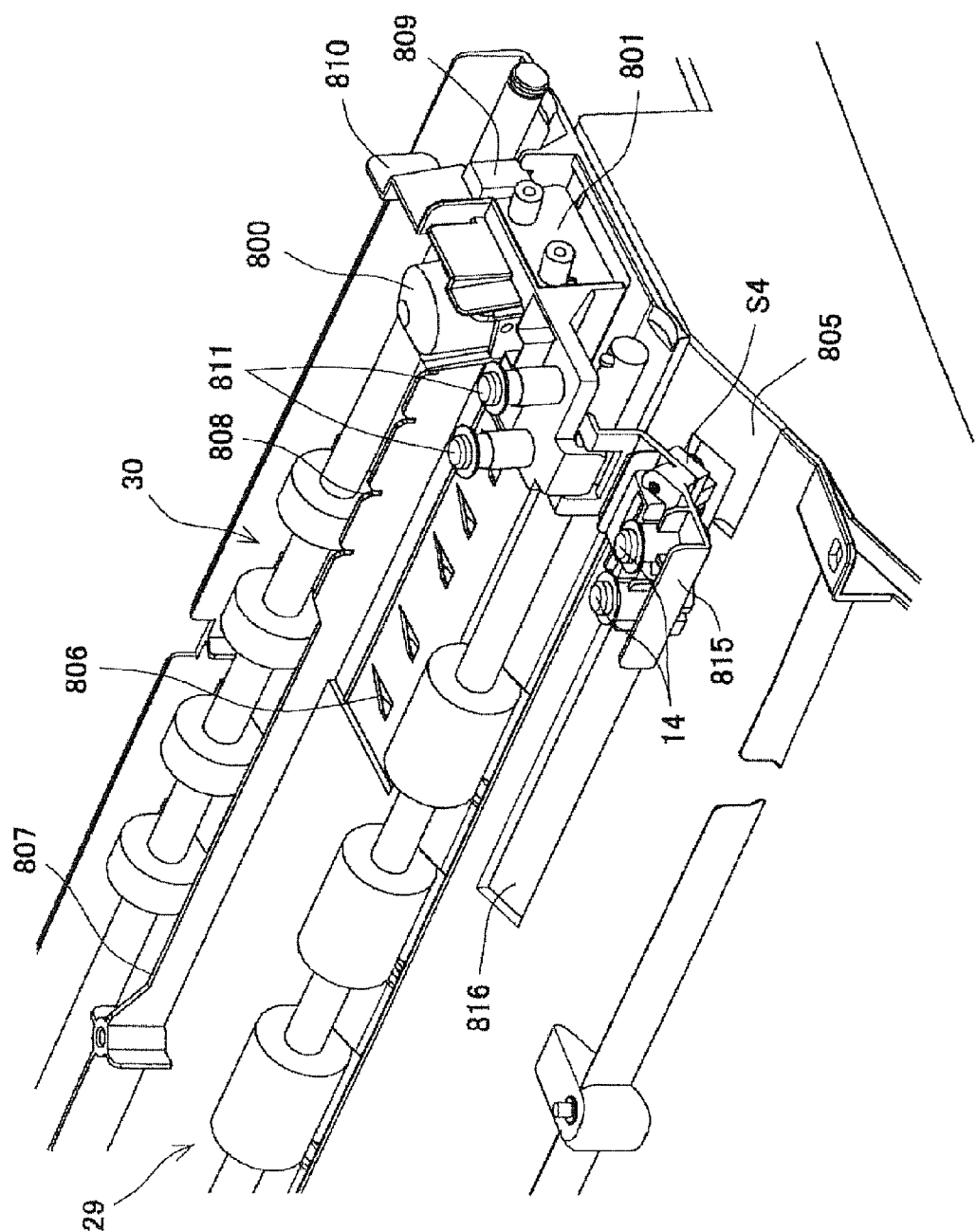
FIG. 3 is an oblique view illustrating the configuration of a printer sensor and its environs, in a state in which a metal frame and plastic head-guide member fixed to the frame have been removed.

The printer sensor S4 will now be explained in detail with reference to FIG. 3.

A sensor support portion 815, made of a synthetic resin (plastic), that supports the printer sensor S4 is fastened to the upstream side (in the direction of conveyance) of the head support portion 801. (The printer sensor S4 and the printer unit 8 are integrated.) A reflective type sensor is mounted to the sensor support portion 815, and the printer head 800 and printer sensor S4 shift unitarily. The printer sensor S4 detects the passing of the conveyed original via the opening 816 formed in the conveyance guide 805, but the detection position of the original in the width direction of the printer sensor S4 is set to be several millimeters to the outside of the conveyance width direction than the printing position of the printer head 800. For that reason, a determination of whether the original is at the printing position of the printer head 800 is securely performed. (This is to determine whether an original has been conveyed to the printing position of the printer head 800; specifically whether the conveyed original is within the print region of the printer head 800.) Also, screw holes are formed in the sensor support portion 815 for the insertion of screws 14. By tightening screws 14 from above the opening 813 shown in FIG. 2, that is guided in the opening 813 and movement is more stable. Note that the distance between the printer sensor S4 and printer head 800 should be as short as is possible to reduce the affects of original skewing and to increase the detection accuracy. Also, the first discharge rollers 29 are disposed near an upstream side of the printer head 8; the second discharge rollers 30 are disposed near a downstream side thereof. These pairs of rollers nip the printed original at the upstream and downstream sides of the printing position thereby reducing shaking of the original that occurs during its conveyance and contributing to a good quality printed image.

Figure 4:
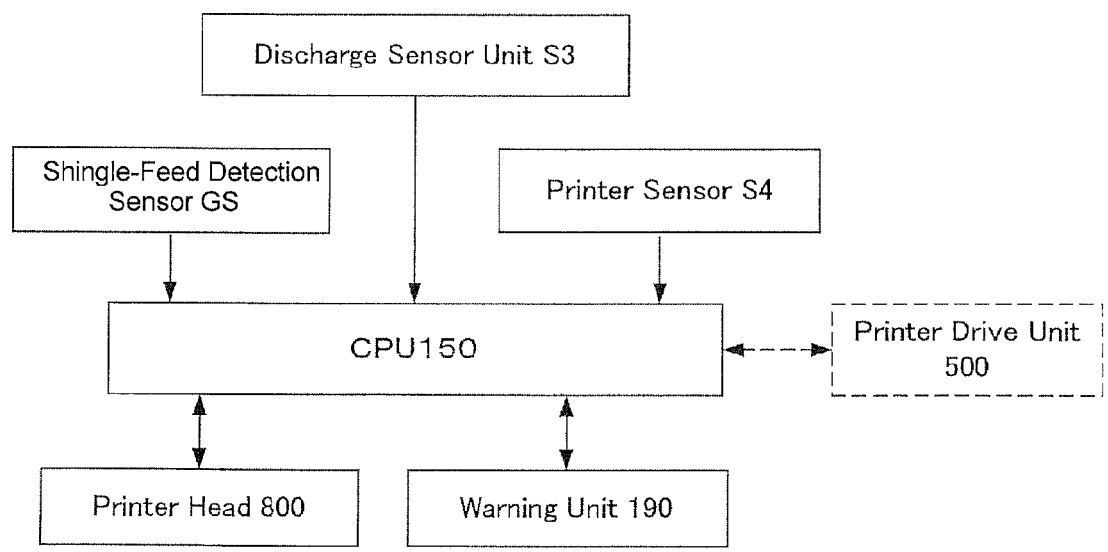
FIG. 4 is a block diagram representing the gross configuration of a CPU.

FIG. 4 shows a schematic configuration of the CPU150 (see FIG. 1, control means) that controls the overall image capturing device 100 that includes the image capturing unit H and the document feeder A. The CPU150 calls up an execution program for the reading process from the ROM. Then, the CPU150 controls the apparatus according to the execution program to convey the original and read images on the original. Particularly, in this embodiment, the CPU150 controls the printing operation of the printer head 800. Note that each of the sensors described above, namely sensors GS, S3 and S4 are electrically connected to the CPU150. Also, a warning unit (warning means) 190 such as an LCD panel or PC screen or the like, is electrically connected to issue a warning when the position along the original width direction of the printer head 800 is improper. As a more detailed example of the warning unit, a PC is the monitor when it is possible to operate the system via a PC driver, if, for example, the image capturing device 100 is connected to a PC or network. Also, if a liquid crystal display panel is equipped on the image capturing device 100, that liquid crystal display panel can be implemented to be a monitor.

Figure 5:
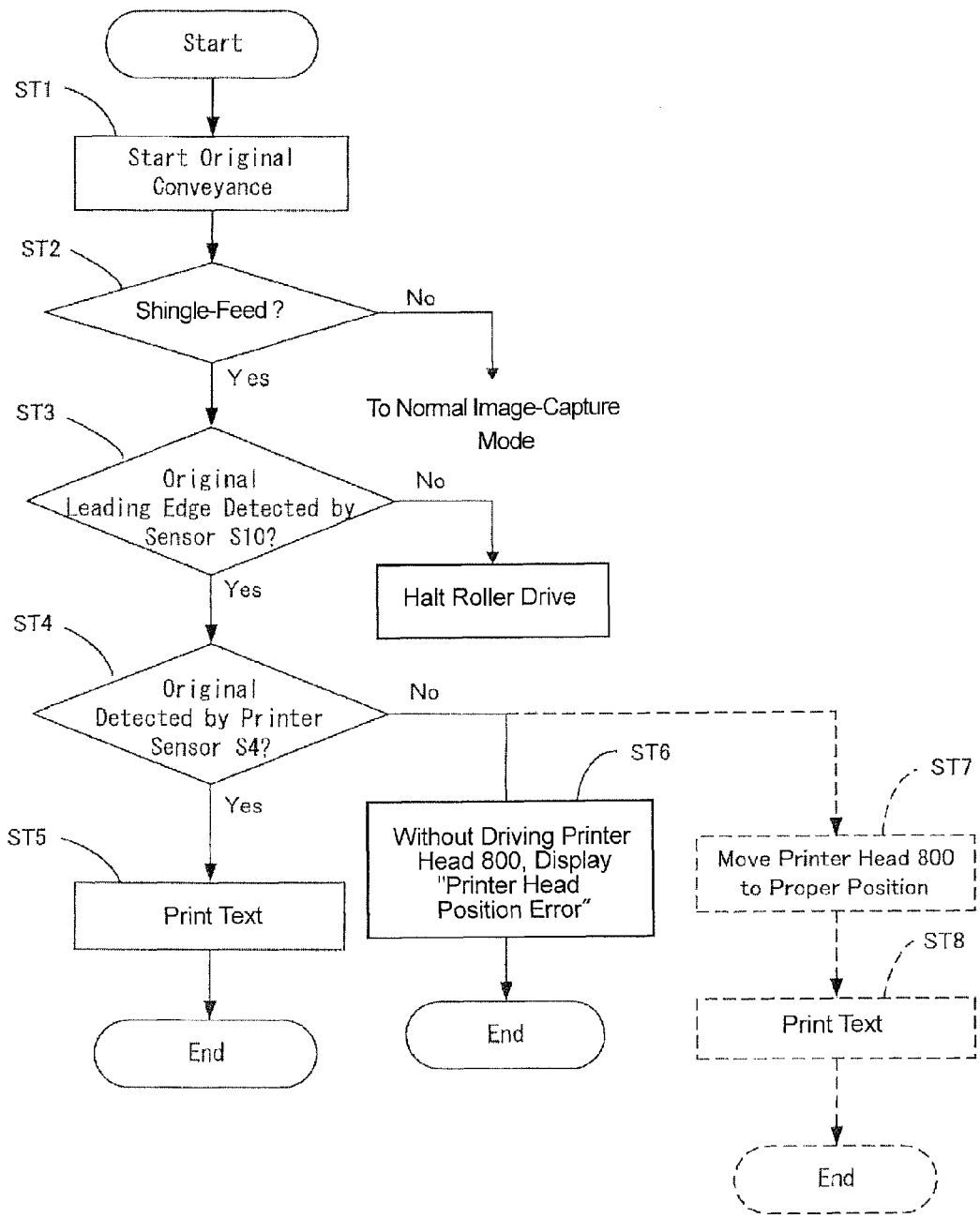
FIG. 5 is a flowchart of operations in the image capturing device involving one embodiment of the present invention.

The operations of the image capturing device 100 having the configuration described above will now be explained in detail with reference to the flowchart of FIG. 5.

Initially, the user moves the printer head 800 to a predetermined position according to the original size prior to reading the original at the image capturing device 100. Along with this, the printer sensor S4 also shifts with it unitarily. Also, the characters and numbers to be printed are predetermined as default, but they can be freely changed using a driver screen on the PC for example to provide further convenience for the user.

Next, when the start button on the image capturing unit H is pressed, conveyance of the original on the feeder tray T will begin when by selecting start key on the PC screen (Step ST1). The original on the feeder tray T is kicked out by the kick roller 21 and conveyed by the feed roller 22. Then, it is conveyed by the registration rollers 24 and feed rollers 25. The shingle-feed detection sensor GS detects whether a plurality of originals have been shingle-fed (Step ST2). If shingle-feeding is not detected, the conveyance of the original is continued according to the normal reading mode. After the original is read at the first reading position 5 and/or the second reading position, the original is discharged to the discharge tray 11.

If shingle-feeding is detected, the system enters the shingle-feed detection mode. In the same way as with the normal reading mode, the feed rollers 25, first reading rollers 26, second reading rollers 27 and the third reading rollers 28 are rotated to continue feeding the original, but reading is not performed on the originals at either of the reading positions 5 or 6. Next, the system determines whether the leading edge of the original has reached the lever 9 (that is, whether the leading edge of the original has been detected by the discharge sensor unit S3) (Step ST3). When the leading edge of the original has been detected, it means that it has passed the position of the lever 9. If the leading edge of the original is not detected, the original stopped somewhere in the conveyance path up to the lever 9, so the drive of each roller is stopped and the user is notified of a jam. Next, the printer sensor S4 detects the presence of the original (Step ST4). If the original is detected by the printer sensor S4 (in other words, if the conveyed original has passed within a range of the print head 800 print region) and the original has passed the printing position, it means that the printer head 800 is set the proper position for the size of the original, so the control from the CPU150 drives the printer head 800 to print characters on the original (Step ST5). Note that printing is set to start after a predetermined amount of time has passed after detection of the leading edge of the original by the discharge sensor unit S3 at step ST3, by measuring from the detection of the discharge sensor unit S3. (In other words, printing is performed by the printer head 800 at a predetermined timing based on detection by the discharge sensor unit S3.) This configuration allows for the starting time to be set freely from the detection of the leading edge of the original to the start of printing allowing the user to freely change the position to print characters in the original conveyance direction, further increasing user convenience.

At step ST4, if the original is not detected by the printer sensor S4, it means that the original is not at the printing position of the printer head 800 (the conveyed original has not passed within the range of the printing region of the printer head 800). In other words, this means that the setting position of the original size and the printer head 800 are incorrect. For example, the conveyed original is A4 portrait, but the printer head 800 is positioned for A4 landscape. In such cases, the CPU150 does not drive the printer head 800, but displays an error message that the setting position of the printer head 800 is incorrect on the warning unit 190 such as a PC screen or the operation panel on the image capturing unit H (Step ST6, or a warning sound can be issued).

As another preferred embodiment, a printer drive unit 500 such as a motor for automatically moving the printer head 800 as shown with the dashed lines of FIG. 4, can be provided to automatically move the printer head 800 rather than manually move it. The printer drive unit 500 can be configured to be controlled by the CPU150. Also, as shown at the dashed lines in FIG. 5, when a determination is performed at step ST4, the CPU150 automatically moves the printer head 800 to the proper position to enable it to print onto the conveyed original (Steps ST7 and ST8).

As described above, with this embodiment, the printer sensor S4 is provided in the conveyance path upstream in the direction of conveyance of the printer unit 8, as detection means to detect whether a conveyed original has passed within a range of the printer unit 8 printing region, so it is possible to prevent improper printing that occurs when the position of the printer unit 8 is incorrect. In other words, it is possible to prevent mis-printing or the wasted consumption of ink that occurs when the printer head 800 because the setting positions of the conveyed original size and printer unit 8 are incorrect.

Furthermore, with this embodiment, the printer sensor S4 is integrated to the printer unit 8 and is configured to travel unitarily with the printer unit 8 along the width direction of the original, so the detection position of the printer sensor S4 varies along with the movement of the printer unit 8, and therefore not only is it possible to efficiently and accurately detect according to original size, no interlocking mechanism is required to interlock the printer sensor S4 to the movement of the printer unit 8. This contributes to a simplified structure, a lower number of components and to a more compact overall apparatus. Also, in addition to this configuration, with this embodiment, the printer sensor S4 is positioned further outside of the width direction of the original than the printer unit 8, so not only is the passage of the original detected by the printer sensor S4, but it is possible to accurately determine whether the original is within the printing range of the printer unit 8.

The embodiment equips the warning unit 190 that warns when the position of the printer unit 8 is improper so misprinting of the printer head 800 is further prevented. Particularly, as with the other preferred embodiment described above, if the printer unit 8 is automatically moved to the proper position when the printer unit 8 position is incorrect, mis-printing of the printer unit 8 can be securely prevented.

Also, with this embodiment, a detection sensor unit S3 that detects the passing of the original is equipped in addition to the printer sensor S4, so it is possible to attain accurate determinations by a determining unit 150B. In other words, if the discharge sensor unit S3 is equipped substantially in the center of the conveyance path that conveys originals using a center reference, any size of original is detected by the sensor 10 of the sensor unit S3 making it possible to accurately convey the original. Therefore, if the setting position of the printer head 800 is incorrect, the original will not be detected by the printer sensor S4, even though it was detected by the sensor 10, making it possible to determine that the setting position of the printer head 800 is incorrect, and to output an error message. However, if the sensor 10 did not exist, when the original is not detected by the printer sensor S4, it cannot be determined whether the original was actually not conveyed or the setting position of the printer head 800 is incorrect. Therefore, it would not be possible to output an error message that the setting position of the printer head 800 is incorrect.

Also, the original is conveyed based on a center reference so the printer sensor S4 and the printer unit 8 only have to move substantially half the width direction of the conveyance path. Therefore, the apparatus is more compact, power consumption is conserved and the forming is simplified.

Note that the present invention is not limited to the aforementioned embodiment; It is anticipated that various modifications and alternative designs may be made without departing from the scope of the invention. For example, this embodiment equips upstream of the printer sensor S4 a discharge detection sensor S3 that detects the leading edge of the original. The drive timing (print start timing) for the printer head 800 is set based on the detection time of the discharge sensor S3, but it is also acceptable to determine the drive timing of the printer head 800 by the printer sensor S4 and not equip the discharge sensor unit S3. (In other words, printing is performed by the printer head 800 at a predetermined timing based on detection by the printer sensor S4.) According to the embodiment described, in the event a shingle-feed of originals is detected by the shingle-feed detection sensor GS, printing is performed on the original by the printer head 800 but this is not to be construed as a limitation. To simply print characters to confirm that the original has been read, or if using a facsimile machine to print characters indicating that the original has be faxed, it is acceptable to set characters to print on an operation panel disposed on a PC screen or image capturing device. Also, according to the embodiment described, originals are conveyed based on a center alignment, but this is not to be construed as a limitation. Originals can also be conveyed along a side position of the conveyance path. Still further, the embodiment positions a discharge sensor unit S3 upstream of the printer sensor S4. However, the discharge sensor S3 can also be disposed at a downstream side of the printer sensor S4.

What is claimed is:

1. A document feeder for conveying document originals from a document placement location, along a predetermined conveyance path, and to a document information-capturing location, the document feeder comprising:
   printing means, shiftable along the document widthwise direction being approximately orthogonal to the document conveyance direction, for carrying out predetermined printing onto conveyed documents;
   a guide member installed in said printing means along the document widthwise direction;
   detection means, provided within the conveyance path further upstream in the document-conveyance direction than said printing means, for detecting whether a conveyed document will pass inside the limits of the range in which said printing means prints; and
   shifting means for shifting said detection means along said guide member, in the document widthwise direction.

2. A document feeder as set forth in claim 1, wherein said printing means and said detection means are configured so as to shift unitarily, with their movement being guided by said guide member.

3. A document feeder as set forth in claim 2, wherein said detection means is located to the outside of said printing means in the document widthwise direction.

4. A document feeder as set forth in claim 1, further comprising control means for controlling printing operations by said printing means, said control means controlling operations of said printing means so that printing by said printing means is performed at a predetermined timing with the moment of detection by said detection means as a referent.

5. A document feeder as set forth in claim 1, further comprising:
   document-passage sensing means, provided further upstream in the conveyance direction than said printing means, for detecting the passage of a conveyed document; and
   warning means for issuing a warning when the passage of a document has been detected by said document-passage sensing means, but the passage of the document has not been detected by said detection means.

6. A document feeder as set forth in claim 1, further comprising:
   drive means for driving said printing means; and
   control means for controls said drive means; wherein
   said control means controls said drive means so as to shift said printing means into proper position to enable the predetermined printing to be carried out on a document when the passage of the document has been detected by said document-passage sensing means, but the passage of the document has not been detected by said detection means.

7. A document feeder as set forth in claim 1, further comprising:
   control means for controlling printing operations by said printing means; and
   document-passage sensing means, provided further upstream in the conveyance direction than said printing means, for detecting the passage of a conveyed document; wherein
   said control means controls said printing means so that when the passage of a document has been detected by said document-passage sensing means and the passage of the document has been detected by said detection means, printing by said printing means is performed at a predetermined timing with the moment of detection by said document-passage sensing means as a referent.

8. A document feeder as set forth in claim 1, further comprising:
   shingle-feed detection means, provided further upstream in the conveyance direction than said printing means, for detecting shingled transport in which a plurality of documents is conveyed overlapping; and
   control means for controlling printing operations by said printing means; wherein
   said control means, when shingled transport has been detected by said shingle-feed detection means and the passage of a conveyed document inside the limits of the range in which said printing means prints has been detected by said detection means, causes said printing means to carry out the predetermined printing on the document.

9. A document feeder as set forth in claim 1, further comprising conveyance rollers, disposed on respective upstream and downstream sides of said printing means in the conveyance direction, for nipping either side of a document traversing said printing means, to convey the document.

10. A document feeder as set forth in claim 1, further comprising positioning means for selectively positioning said printing means in a plurality of locations along the document widthwise direction.

11. A document feeder as set forth in claim 10, further comprising center-referent delivery means for delivering a document from the document placement location in such a way as to approximately align the document centerline in its widthwise direction with the centerline of the conveyance path.

12. A document feeder as set forth in claim 11, wherein said printing means is provided further downstream in the conveyance direction than the document information-capturing location.

13. A document-information capturing device comprising:
   a document feeder as set forth in claim 1; and
   image capturing means for capturing image information from a conveyed document in the document information-capturing location.

* * * * *